Patented Nov. 8, 1949

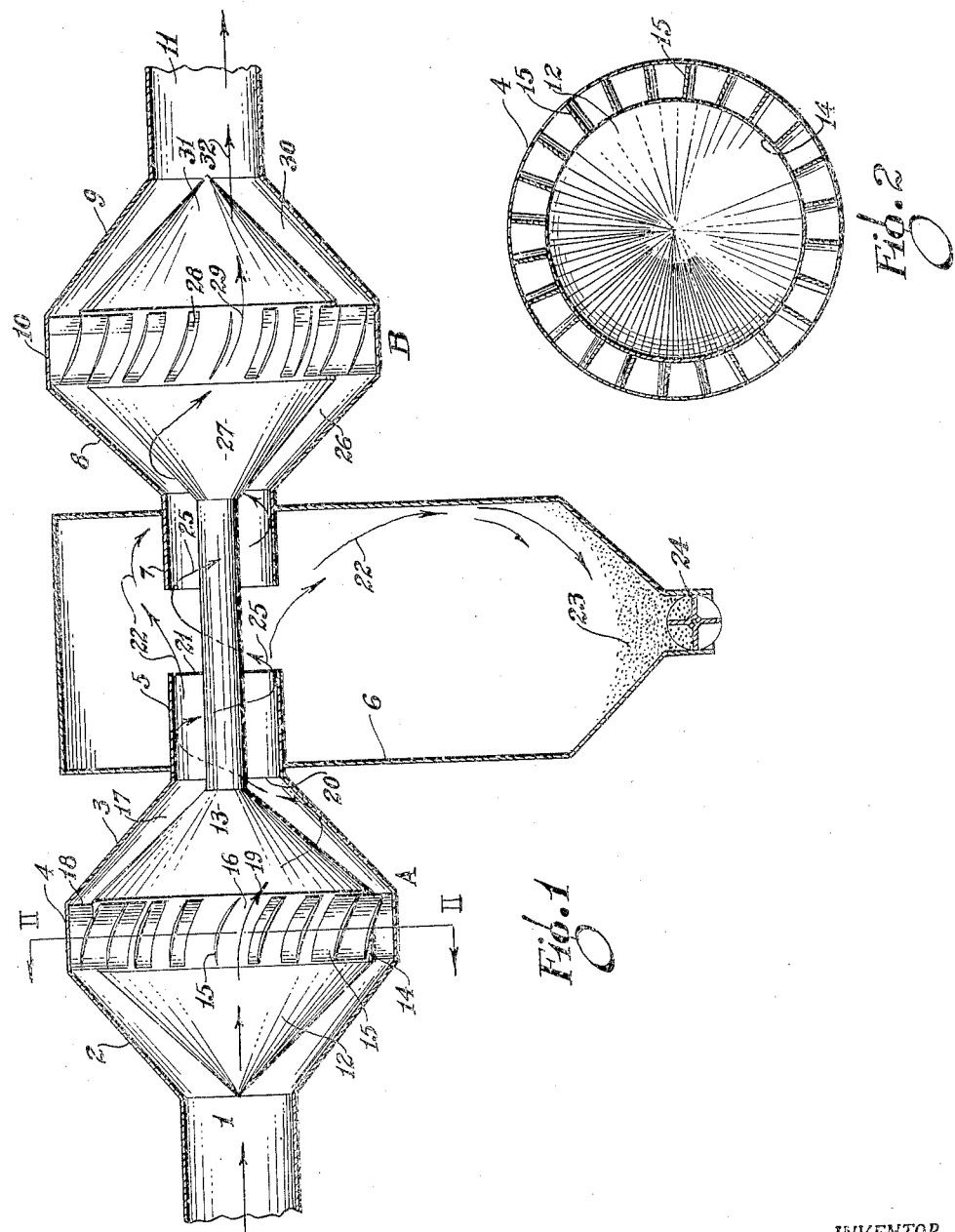

2,487,633

UNITED STATES PATENT OFFICE 2,487,633

SEPARATOR

Joseph Breslove, Jr., Pittsburgh, Pa.

Application January 29, 1947, Serial No. 724,960

7 Claims. (Cl. 183—80)

My invention relates to the art of separating solids from fluids in which they are entrained and more particularly comprises an improved method and means for separating particles from gases such as removing cinders and fly ash from boiler flue gas or cleaning air in industrial processes such as removing impurities in exhaust systems and the like.

While present methods and apparatus accomplish the separation of particles from a gas or fluid in which they are entrained, such separation requires high power consumption or a high pressure drop throughout the apparatus. For example, to remove cinders and fly ash from flue gas from a boiler according to present methods and apparatus now in use and with which I am familiar, the use of a fan is required to overcome the high pressure drop through the separator and to effect more complete particle removal. Unless a high pressure drop is present in such apparatus, the separation is very inefficient and actually ineffective to remove a high percentage of fine particles from the gas. In known systems operating on a low pressure drop such as baffle systems, the efficiency of separation is of a low order.

It is, therefore, an object of the present invention to efficiently separate from a gas or fluid solid particles which may be entrained therein and to effect such separation at low power consumption, that is, without a high pressure drop through the apparatus.

It is another object of the invention to efficiently remove, for example, cinders and fly ash from flue gas from a boiler at a low enough pressure drop that the draft of the chimney or exhaust alone will suffice, so that the use of a fan or other means to increase the draft will be unnecessary.

A further object of the invention consists in treating a gas or fluid laden with particles so that the laden gas or fluid will be subjected to a sharply increased rotational velocity and progressive centrifugal acceleration and then at maximum acceleration to discharge the particles therefrom by converting the pressure energy into kinetic energy, and then recovering the energy expended to produce the acceleration after the fluid or gas has been cleaned by reconverting the kinetic energy back into pressure energy, thus greatly decreasing the overall pressure drop in the process and consequently greatly reducing the power consumption or draft loss.

Other objects and advantages of my invention will become apparent as the following description of two embodiments thereof progresses, reference being made to the accompanying drawings in which like reference characters are employed to designate like parts throughout the same.

Figure 1 is a sectional view through one form of apparatus embodying my invention;

Figure 2 is a section taken on line II—II of Figure 1, and,

Figure 3:
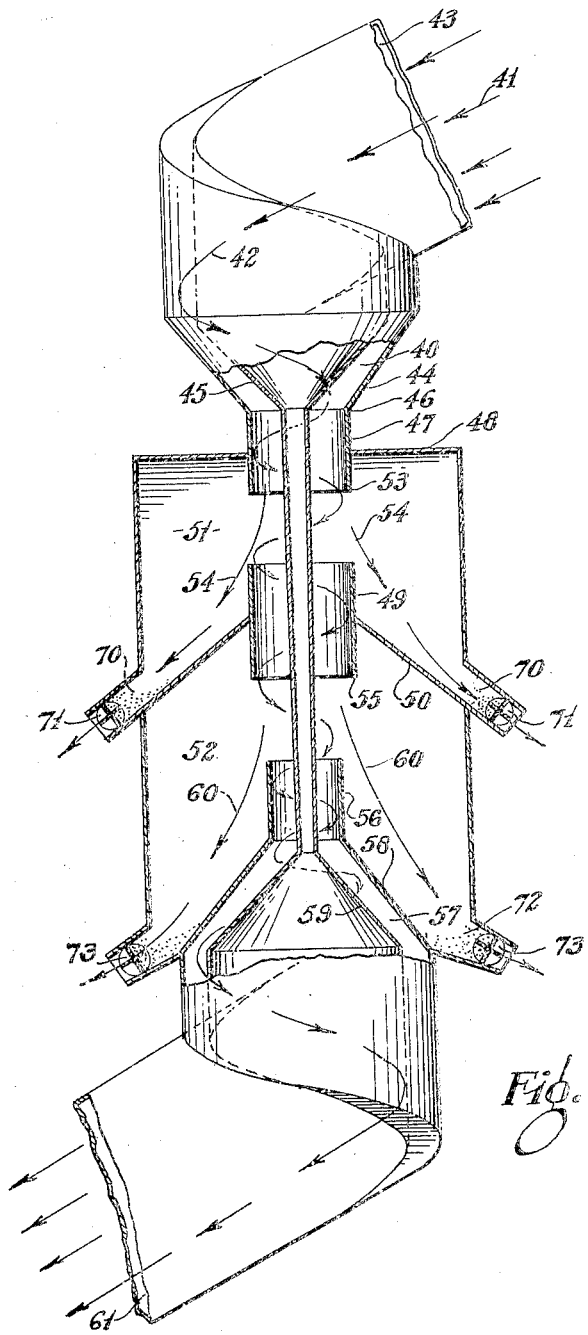
Figure 3 is a partial vertical section through an apparatus embodying another form of the invention which is adapted for multiple stage separation.

It has been the usual practice in the mechanical separation of particles from an entraining fluid such as flue gas to whirl the laden fluid to produce a high centrifugal acceleration of the same. The whirling column of fluid is then directed into a receiver where it is discharged. Considerable pressure energy is required to be expended in producing this whirling motion and manifests itself in a high pressure drop in the apparatus, the pressure energy thereby actually being converted into kinetic energy.

In carrying out my invention, the energy expended to produce acceleration of the laden gas or fluid and which is thus converted into kinetic energy, is in a large measure recovered by reconverting the kinetic energy into pressure energy after the laden gas or fluid gives up its entrained particles.

The greater part of the energy required to produce the velocities and rotation of the gas necessary for efficient separation of the particles entrained therein is thus recovered and it follows that the overall pressure drop of the apparatus is greatly decreased as distinguished from the methods and apparatus heretofore used. Consequently the power consumption or draft loss is greatly reduced.

Referring first to Figures 1 and 2 in which I have illustrated one embodiment of my invention, the apparatus therein shown consists of an intake unit A, a receiver, and an outlet unit B. The intake unit A includes an intake pipe or tube 1 communicating with an outer casing comprising truncated cone portions 2 and 3 arranged in reversed relationship to each other so that the larger diameters thereof are adjacent and are connected by the cylindrical band portion 4. A smaller diameter of the conical portion 3 communicates with a cylindrical portion 5 projecting into one side of a closed receiver 6.

On the opposite side of the receiver and in axial alignment with the unit A is the unit B comprising a cylindrical portion 7 spaced from the portion 5, the reversed truncated cone portions 8 and 9, the connecting band 10 and the outlet 11.

In further carrying out my invention, I provide means within the unit A whereby the laden gas column entering the unit A axially thereof at 1 may be brought into a state of rotation and then at sharply increased rotational velocities as the gas approaches and enters the portion 5. Similar means is provided within the unit B but is reversed whereby the velocities of the rotating gas stream, after having passed from the cylinder 5 to the cylinder 7 and thus relieved of its entrained particles, may sharply be reduced and discharged through the outlet 11 in substantially a non-rotating column.

More specifically such means as applied in unit A may comprise a closed hollow body axially supported within and in spaced relation to the said unit, said body having one end of substantial conical figuration as at 12, the apex of the cone being adjacent the intake tube 1. The other end of the body is of similar conical form but is reversed with respect to the end 12 as at 13, the bases of the cones being adjacent one another but separated by a cylindrical portion 14. Between the concentric portions 4 and 14 there are arranged a plurality or annular series of spaced curved blades 15, which may be fixed or pivotally mounted for angular adjustment, if desired, to impart an increased or decreased angular direction of flow of the laden gases therebetween and subsequently through the annular passage 17 defined by the wall of the cone 13 and the wall 3 of the casing, and into the cylinder 5.

It is to be noted that the passage defined by the walls 2 and 12 is of substantially constant cross-sectional area and that its radius in cross section is progressively increased to a maximum radius at 4 where the fluid passes between the curved blades or vanes 15. As a result of this, some drop in pressure occurs between the inlet 1 and that point where the fluid body leaves the vanes in a rotating movement, but since the fluid body emerging from the vanes is of a relatively high radius in annular cross section but of relatively low rotational velocity at this point, the pressure drop is not high. The pressure energy thus expended may, in accordance with my invention, be recovered as will appear hereinafter.

The laden fluid body having passed between the vanes 15 which produce rotation of the body, enters the annular passage 17 at 18, as indicated by the arrow 19. The passage 17 is of decreasing radius but by properly converging the walls 3 and 13 toward the vanes, the annular area of the passage 17 may be substantially constant. As the rotating fluid body passes through the passage 17, its radius is decreased causing a sharp increase or acceleration in rotational velocity of the fluid accompanied by a drop in pressure between the points 18 and 20. This increased velocity and resultant increased kinetic energy is produced by the work done in overcoming centrifugal force as the fluid body passes along the passage in which the radius is progressively reduced.

As the whirling laden fluid body enters the cylinder 5 it is rotating at high velocity. Under such conditions the heavier particles entrained in the whirling column are caused to run along the inner surface of the cylindrical wall of the member 5 as the fluid column advances and finally to be discharged tangentially of the free end of the cylinder as indicated by the arrows 22, into the receiver 6. The particles thus liberated from the fluid column will fall to the bottom of the receiver after their momentum is spent, as at 23, where they may be removed through a lock gate 24, as desired.

The cylinder 7 is in axial alignment with the cylinder 5 and is spaced axially therefrom sufficiently to permit the particles ejected from the fluid body as it leaves the cylinder 5 to pass tangentially outwardly of the fluid column as the whirling column passes axially into the cylinder 7 as indicated by the arrow 25. The cylinder 7 may be of substantially the same diameter as that of the cylinder 5, although the diameter of the former may be slightly reduced, in which event I have found that the particle separation may be further enhanced, particularly in the separation of the more minute particles from the fluid column. I have found by experiment that there will be extremely little pressure drop in the fluid between the cylinders 5 and 7 as long as the receiver 6 remains closed to the outside atmosphere, but it will be understood that, as compared with the relatively high pressure zone occupied by the vanes 15, the zone including the cylinders 5 and 7 and therebetween is one of relatively low pressure due to the sharply accelerated rotational velocity imposed on the fluid body in converting the pressure energy of the moving body into kinetic energy.

As has been stated before, my invention accomplishes a separation of entrained particles from a fluid body in a highly efficient manner by virtue of the fact that I have provided means whereby the draft loss and power consumption are greatly reduced as compared to present separation methods and apparatus.

Such means is illustrated in Figure 1 and comprises a unit B which may be termed an energy reconverting means.

The unit B may comprise a structure substantially the same as that of unit A but which is arranged in reversed relation to the unit A; that is, the unladen whirling fluid column passing to the right from the cylinder 7 will enter the passage 26 defined by the casing wall 8 and the inclined wall of the truncated cone member 27. Since the radius of the passage 26 increases from left to right in Figure 1, the rotational velocity of the whirling fluid body passing therealong will be reduced progressively and a corresponding amount of work will be done on the means which constrains the fluid body to travel in a circular path. A body of fluid rotating through an average increasing radius will be decelerated and its kinetic energy will be converted into pressure energy. As the unladen fluid body reaches the area of the straightening vanes at greatly decreased angular velocity, it passes between the vanes in the direction of the arrow 29 and into the annular passage 30 defined by the cone 31 and the casing wall 9, where its flow again becomes substantially non-rotational. As indicated by the arrow 32, the straightened fluid body will then pass through the cylinder or outlet 11 at increased pressure as a result of the reconversion of its kinetic energy in the unit B to pressure energy.

By thus converting the kinetic energy into pressure energy, a relatively high pressure zone is established in the cylinder 11. The pressure drop or draft loss between the intake cylinder 1 and the cylinder 11 is indeed very low, whereas the pressure drop or draft loss between the intake 1 and the zone of high rotational velocity as at 5 and 7 is considerable.

It, therefore, becomes apparent that by the provision of means such as unit B for reconverting the kinetic energy of the fluid body into pressure energy after it has shed its entrained particles at high rotational velocity, the power consumption of the operation and the pressure drop or draft loss in a fluid system in which the apparatus is used is reduced far more than is at present the practice. It will also be seen that the use of my invention in a flue or stack will result in little or no impairment of the draft characteristics of the flue or stack and that, because of the extremely low pressure drop across the apparatus, the same readily may be installed in flues or stacks without the necessity of making extensive alterations in such equipment.

In Figure 3, I have illustrated a modified form of the invention which is similar in principle to the form described above, but which embodies means for multiple stage separation of particles from a moving fluid body.

Another variation of this modification resides in the elimination of the use of blades or vanes to produce a rotation of the entraining fluid body as has been disclosed and described in connection with Figure 1. Rotation of the fluid body may be obtained by causing the laden fluid to enter the acceleration chamber or passage 40 in a direction tangential thereto as indicated by the arrows 41 and 42 through a suitable intake duct 43 having communication with the passage 40. As illustrated in the drawing, the passage 40 is an annular passage defined by the upwardly converging casing or jacket wall and the cone wall 44 and 45 respectively. The accelerating passage 40 communicates at its lower end 46 with a coaxial cylinder 47 which projects into and may be supported by the receiver 48. In alignment with and spaced from the lower end of the cylinder at a predetermined distance is a cylinder 49 of substantially the same internal diameter as that of the cylinder 47. An intermediate cylinder 49 is supported within the receiver by means of an inclined annular wall 50 dividing the receiver into an upper compartment 51 and a lower compartment 52.

As has been explained in connection with the form of my invention illustrated in Figure 1, the heavier particles entrained in the whirling fluid entering the cylinder 47 and passing axially therealong will, due to its high rotational velocity, run along the inner wall of the cylinder until they reach the edge 53 thereof when they will be ejected tangentially from the fluid body and into the compartment 51 as indicated by the arrows 54. Meanwhile the whirling fluid body will pass into the cylinder 49, still entraining some of the more minute and lighter particles.

By means of the modification shown in Figure 3, however, I have provided means whereby the fluid body may be subjected to a second separation stage for removing the lighter particles.

In carrying out this form of the invention, the cylinder 49 is open ended at 55 and projects into the lower receiver compartment 52. A cylinder 56 in axial alignment with the cylinders 47 and 49 is selectively spaced from the lower open end of the cylinder 49 and communicates at its opposite end with a fluid deceleration annular passage 57 formed between the downwardly converging annular walls of the jacket 58 and the cone 59.

It will be noted that the internal diameter of the cylinder 56 is substantially less than that of either of the cylinders 49 or 47. By such means and arrangement I am enabled to further accelerate the rotation of the fluid body as it passes from the intermediate cylinder 49 and into the cylinder 56, thus enabling the finer and lighter particles still entrained in the fluid as it leaves the cylinder 49, to be thrown off tangentially as indicated by the arrows 60 into the lower compartment 52.

The rotational velocity of the accelerated unladen fluid body passing from the cylinder 56 will be progressively decreased in the annular decelerating passage 57 as the fluid approaches the larger diameters thereof and the fluid body may be taken from the passage in the direction tangential thereto through the duct 61 in a straightened or lineal flow.

Thus it will be seen that the linear flow of the laden fluid first is given an initial rotation as it enters the acceleration passage 40 by directing the same in a direction tangential to the passage inlet. As the fluid passes downwardly around the cone 45 in the passage 40 its rotational velocity is sharply accelerated and its pressure energy is thus converted into kinetic energy.

Passing through the first separation stage cylinder 47 the heavier particles entrained in the whirling fluid will be ejected into the upper receiver compartment 51 and will fall upon the inclined wall 50 and may be removed from time to time through the discharge openings 70 and the lock gates 71. Continuing on, the whirling fluid column will pass through the second separation stage cylinder 49, and, by virtue of the added rotational acceleration imparted to the column by the reduced diameter of the cylinder 56, the lighter particles carried into the cylinder 49 will be ejected tangentially thereof into the lower receiver compartment 52. They may be removed from this compartment through the outlets 72 and the lock gates 73 when desired.

The unladen whirling fluid body then passes into the annular decelerating passage where its rotational velocity is progressively decreased. During this step the kinetic energy of the body is therefore reconverted into pressure energy.

I have discovered by actual test and measurement that the overall pressure drop from the inlet 43 to the outlet 61 is relatively small because of the fact that, after the desired unburdening of the fluid of its entrained particles, the kinetic energy of the whirling fluid body is reconverted into pressure energy. In all the methods of separating solid particles from fluids, of which I am aware, separation is either inefficient or entails a considerable consumption of power. By my invention I am enabled to accomplish efficient separation at low power consumption.

From the foregoing description of the invention, and as illustrated in Figures 1 and 3 wherein the particle receptacles 6 and 52 respectively, are shown as closed, it will be understood that while the rotational velocity of the fluid body is made to vary as the fluid travels along the fluid passage by varying the radii of the passage, the axial velocity of the fluid body remains substantially constant throughout its travel in the apparatus by virtue of the fact that the cross-sectional area of the passage through which the fluid flows is substantially constant.

I claim:

1. An apparatus for separating solid particles from an entraining fluid, including a receptacle for the particles separated from said fluid, a fluid inlet casing, a fluid outlet casing, said casings being in substantial axial alignment and communicating with said receiver and with each other, said casings terminating within said receiver in annular spaced apart portions of reduced diameter, and each including frusto-conical portions oppositely disposed adjacent said receiver, a core member extending axially through said casings and said receiver and forming therebetween an annular passage for the entraining fluid, the radii of said passage being of a decreasing order through said first casing and of an increasing order through said second casing in the direction of fluid flow, the cross-sectional area of said passage being substantially constant throughout the extent of said passage, and means associated with said first casing for imparting a rotational flow to said laden fluid.

2. An apparatus for separating solid particles from an entraining fluid, including a receptacle for the particles separated from said fluid, a fluid inlet casing, a fluid outlet casing, said casings being in substantial axial alignment and communicating with said receiver and with each other, said casings terminating within said receiver in annular spaced apart portions of reduced diameter, and each including frustro-conical portions oppositely disposed adjacent said receiver, a core member extending axially through said casings and said receiver and forming therebetween an annular passage for the entraining fluid, the radii of said passage being of a decreasing order through said first casing and of an increasing order through said second casing in the direction of fluid flow, the cross-sectional area of said passage being substantially constant throughout the extent of said passage, and means associated with said first casing for imparting a rotational flow to said laden fluid, and means associated with said second casing for straightening out the rotational flow of said unladen fluid.

3. An apparatus for separating solid particles from an entraining fluid stream comprising an intake duct, a passage leading from said intake duct and communicating with a particle receiver, a particle receiver, means for imparting a rotational movement to the fluid stream in said passage, said passage having a progressively reduced radius and a substantially constant cross-sectional area to sharply increase the rotational velocity of said rotating stream without materially affecting its axial velocity as the same passes therethrough and to cause the entrained particles to be ejected tangentially of the stream into said receiver, means communicating with the receiver to receive the unladen whirling fluid stream and comprising a passage having a progressively increased radius and a substantially constant cross-sectional area to sharply decrease rotational velocity of the fluid without materially affecting its axial velocity, means to render the rotationally slowed fluid stream substantially non-rotating, and an outlet for said unladen fluid stream, whereby the pressure drop between said inlet and said outlet of the apparatus will be small relative to the pressure drop between the inlet and the receiver.

4. An apparatus for separating solid particles from a rotating entraining fluid stream comprising an outer casing and an inner core forming therebetween an annular passage of progressively reduced radii but of substantially constant cross-sectional area, whereby the rotational velocity of the entraining fluid stream passing therethrough will be sharply accelerated, a particle ejecting passage leading from the annular passage and in axial alignment therewith, a particle receiver, and an outer casing and an inner core forming therebetween an annular passage communicating with said receiver and having progressively increased radii and a substantially constant cross-sectional area whereby the rotational velocity of the unladen fluid stream is sharply decelerated.

5. An apparatus for separating solid particles from a rotating entraining fluid comprising an outer casing, an inner core spaced from said casing and providing an annular fluid passage therebetween, said passage being characterized by having a substantially constant cross-sectional area at decreasing casing and core radii in the direction of fluid flow, a tube communicating with the discharge end of said passage and having a free edge from which said particles passing therethrough are caused to be projected substantially tangentially outwardly of said edge and into a receptacle, a receptacle for said particles, and means for conveying the unladen fluid comprising an outer casing and an inner core spaced from said casing and providing therebetween an annular fluid passage characterized by having a substantially constant cross-sectional area at increasing casing and core radii throughout in the direction of fluid flow.

6. An apparatus for separating solid particles from a rotating entraining fluid stream having a substantially constant axial velocity, said apparatus including an outer casing and an inner core spaced from said casing and forming therebetween a rotational velocity accelerating passage of substantially constant cross-sectional area but of decreasing radii in the direction of fluid flow, a particle ejecting passage communicating with a receiver, a receiver for the particles ejected from the fluid, a second particle ejecting passage in axial alignment with said first ejecting passage for ejecting those particles of lighter weight not previously ejected from the fluid, and rotational velocity decelerating means communicating with said receiver to receive the unladen fluid and comprising a casing and a core spaced from said casing and forming a passage therebetween, said passage being characterized by having a substantially constant cross-sectional area but of increasing radii in the direction of fluid flow, and an outlet leading from said last named passage.

7. An apparatus for separating solid particles from a rotating entraining fluid stream having a substantially constant axial velocity, said apparatus including an outer casing and an inner core spaced from said casing and forming therebetween a rotational velocity accelerating passage of substantially constant cross-sectional area but of decreasing radii in the direction of fluid flow, a particle ejecting passage communicating with a receiver, a receiver for the particles ejected from the fluid, and rotational velocity decelerating means communicating with said receiver to receive the unladen fluid and comprising a casing and a core spaced from said casing and forming a passage therebetween, said passage being characterized by having a substantially constant cross-sectional area but of increasing radii in the direction of fluid flow, and an outlet leading from said last named passage.

JOSEPH BRESLOVE, JR.

REFERENCES CITED

The following references are of record in the file of this patent:

UNITED STATES PATENTS

| Number | Name | Date |
|---|---|---|
| 1,842,082 | Edridge | Jan. 19, 1932 |
| 2,048,613 | McKee | July 21, 1936 |
| 2,193,883 | Reeves | Mar. 19, 1940 |
| 2,322,414 | Bowen | June 22, 1943 |
| 2,375,203 | Appeldoorn | May 8, 1945 |